June 11, 1968  E. S. CRUZ  3,387,802
AIRCRAFT LANDING GEAR

Filed July 5, 1966  5 Sheets-Sheet 1

INVENTOR.
EDWARD S. CRUZ
BY
*George C. Sullivan*
Agent

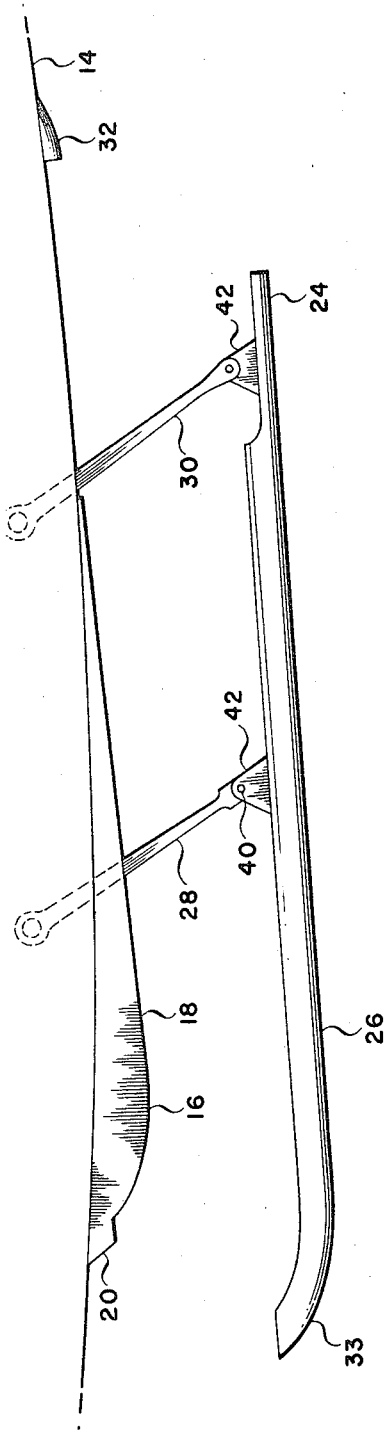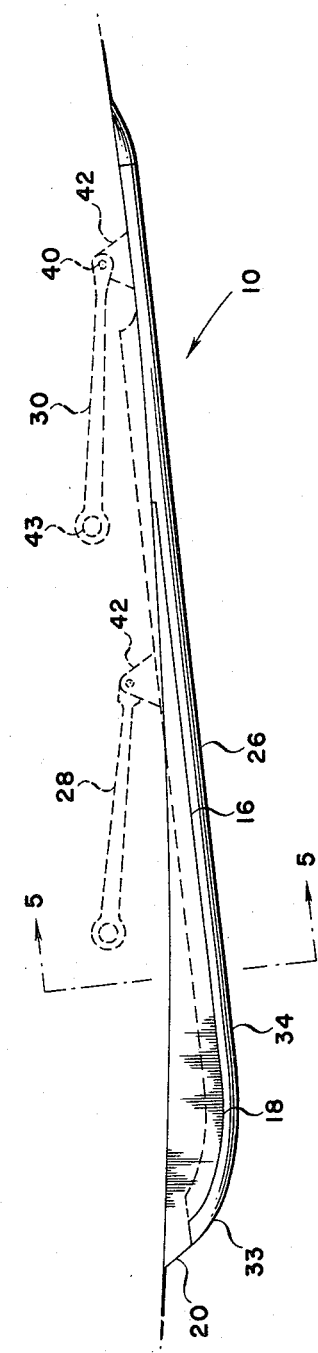

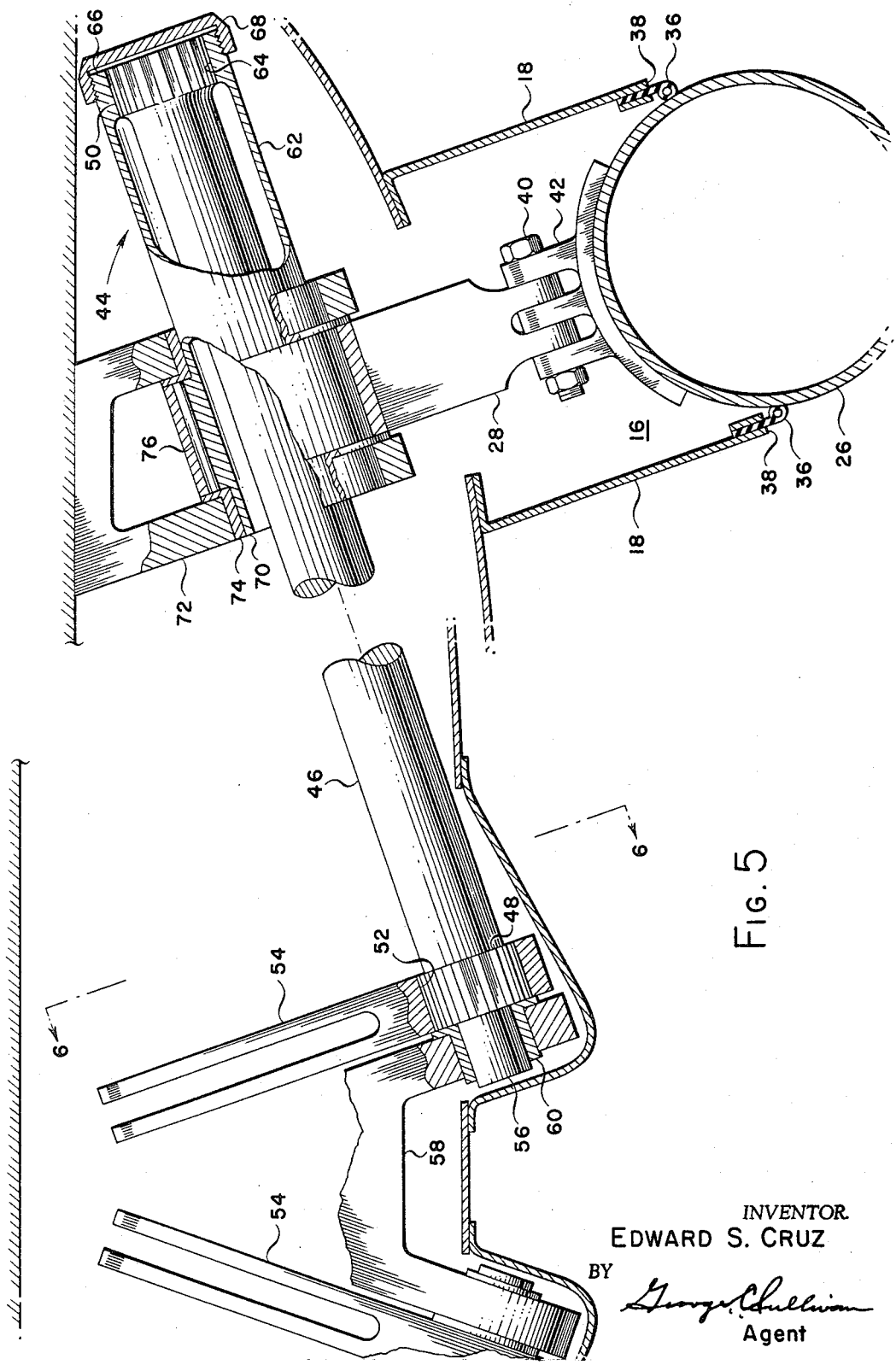

INVENTOR.
EDWARD S. CRUZ
BY George C. Sullivan
Agent

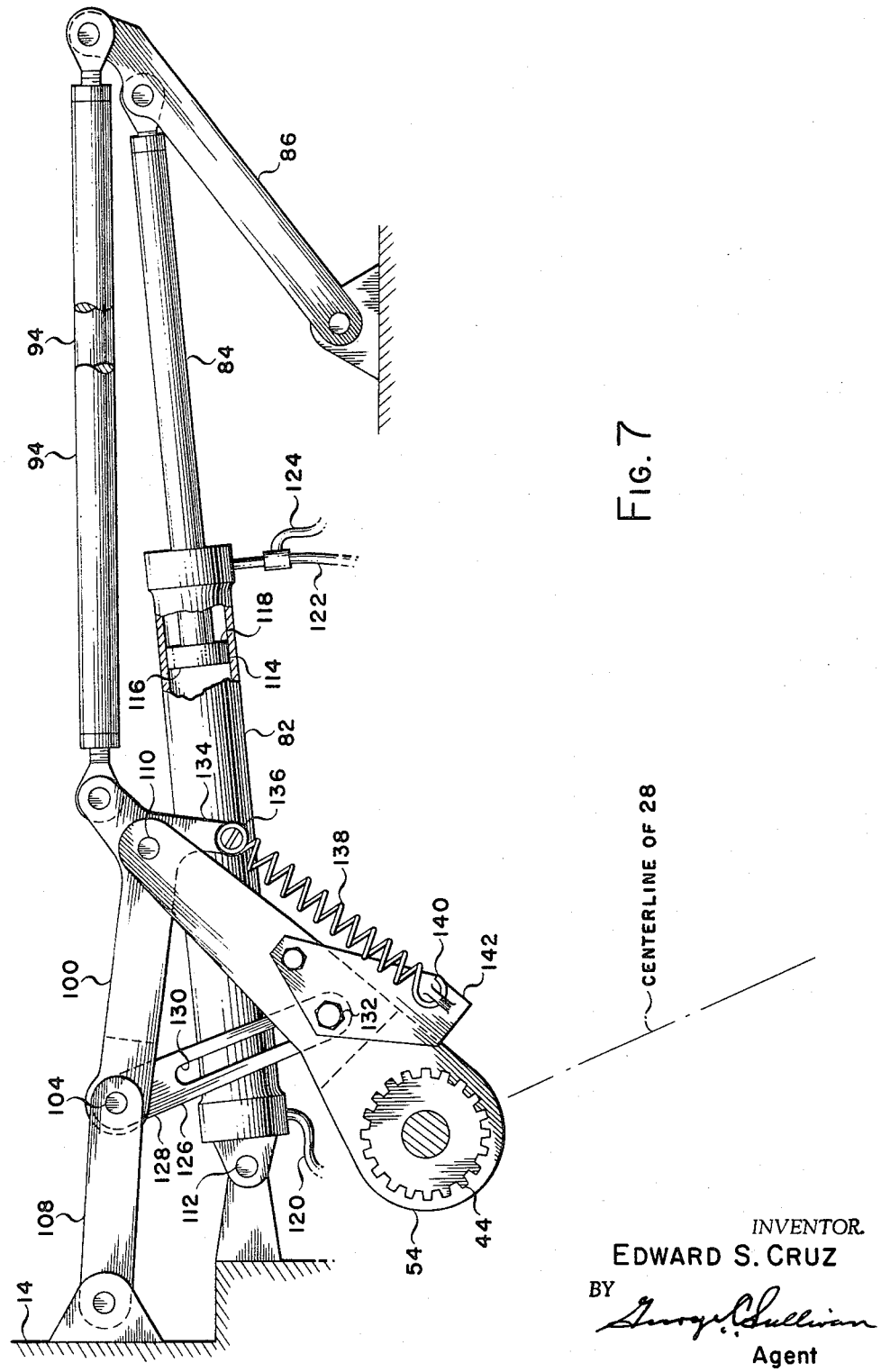

United States Patent Office 3,387,802
Patented June 11, 1968

3,387,802
AIRCRAFT LANDING GEAR
Edward S. Cruz, Van Nuys, Calif., assignor to Lockheed
Aircraft Corporation, Burbank, Calif.
Filed July 5, 1966, Ser. No. 562,661
8 Claims. (Cl. 244—102)

ABSTRACT OF THE DISCLOSURE

A retractable landing gear for an aircraft including a pair of struts, one end of each being pivotally connected to the aircraft fuselage with the other end being connected to a landing skid. A portion of the landing skid cooperates with the fuselage to present an aerodynamically clean surface when the landing gear is in its retracted position.

---

The invention relates to an aircraft landing gear, and more particularly to a retractable skid-type landing gear for helicopters.

It is known that the range and speed of aircraft can be increased by retracting the aircraft landing gear into the aircraft fuselage during flight to minimize aerodynamic drag. Certain prior art aircraft are provided with doors on the fuselage which open to permit the landing gear to be extended from the fuselage to the exterior thereof during landing operations, and which close during flight when the landing gear is housed within the fuselage. Such retractable landing gear add to the first cost of the aircraft and present certain maintenance problems. In addition, the mechanism required to open and close the doors adds to the cost and the weight of the aircraft.

Furthermore, should the system employed to open the doors fail so that the doors cannot be opened, the wheels cannot be extended during landing with resultant damage to the aircraft.

Another disadvantage resides in the fact that prior art retractable landing gears do not provide structure on which the aircraft can land when the gear is retracted.

In view of the foregoing factors and conditions characteristic of aircraft landing gear, it is a primary object of the present invention to provide a new and useful landing gear not subject to the disadvantages enumerated above and which provides structurally strong longerons for landings with the gear retracted, if required.

Another object of the present invention is to provide retractable landing skids for aircraft which, when in the retracted position, are mated with the fuselage to present an aerodynamically clean surface.

Yet another object of the present invention is to provide landing skids for aircraft which will free-fall to an extended position if the actuator for extending the gear preparatory to landing fails.

A further object of the present invention is to provide a new and useful retractable landing skid for helicopters.

According to the present invention, a helicopter is provided with landing skids which retract into wells provided in the outer skin of the fuselage so that, in the retracted position, the skids are mated with the fuselage to present an aerodynamically clean surface. In the retracted position, the skids have a lower surface forming the external surface of the fuselage at its lowest point on each side thereof so that the skids provide structurally strong longerons for landing with the gear retracted.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 3 is a partial, elevational view, on an enlarged scale, of the landing gear of FIGURE 1 in an extended position;

FIGURE 4 illustrates the landing gear of FIGURE 3 in a retracted position;

FIGURE 5 is an enlarged cross-sectional view taken along line 5—5 of FIGURE 4, a portion of the actuator linkage structure having been deleted for purposes of clarity;

FIGURE 7 is a cross-sectional view similar to FIGURE 6, but showing the landing gear in an extended position.

Referring again to the drawings, a landing gear, generally designated 10, constituting a presently preferred embodiment of the invention, is shown for purposes of illustration, but not of limitation, as being embodied in a helicopter 12.

Figure 2:
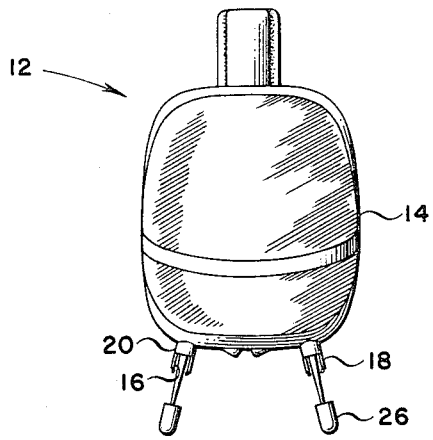
FIGURE 2 is a front view of the helicopter of FIGURE 1.

The helicopter 12 includes a fuselage 14 which is provided with a pair of landing gear wells 16 along its lower edges. Each well 16 is formed on fuselage 14 by a pair of spaced, parallel wall members 18 (FIGURE 5) which are joined at their forward ends by rounded nose portions 20 (FIGURE 2). The wall members 18 are faired into fuselage 14 at their aft ends 22 ahead of the aft ends 24 of their associated skid-type landing elements 26 which, in turn, are swingably connected to helicopter 12 by forward struts 28 and aft struts 30. When the landing gear 10 is retracted, as shown in FIGURE 4, its skids 26 cooperate with the wells 16 and a pair of modified tear-drop members 32 in such a manner that the skids 26, the nose portions 20, the walls 18, and the tear-drop members 32 form a continuation of the contour of fuselage 14 to present an aerodynamically clean surface. This minimizes aerodynamic drag when the helicopter 12 is in flight with the landing gear 10 in its retracted position.

The skids 26 may be constructed of a generally tubular cross-section and have a lengthwise configuration conforming substantially to the lengthwise contour of the wells 16 and fuselage 14. The skids 26 include upwardly curved portions 33 at their forward ends which merge into the nose portions 20 when the skids are retracted to enhance the aerodynamically clean surface previously described. However, it is to be noted that the lower surface 34 of each skid 26 protrudes slightly below its associated well 16 and the fuselage 14 so that the surface 34 constitutes a ground contacting surface even though the landing gear 10 is in its retracted position. A flexible sealing member 36 is affixed to the lower edge 38 of each wall member 18 to seal the wells 16 when the landing gear 10 is in its retracted position, as shown in FIGURE 5.

Figure 1:
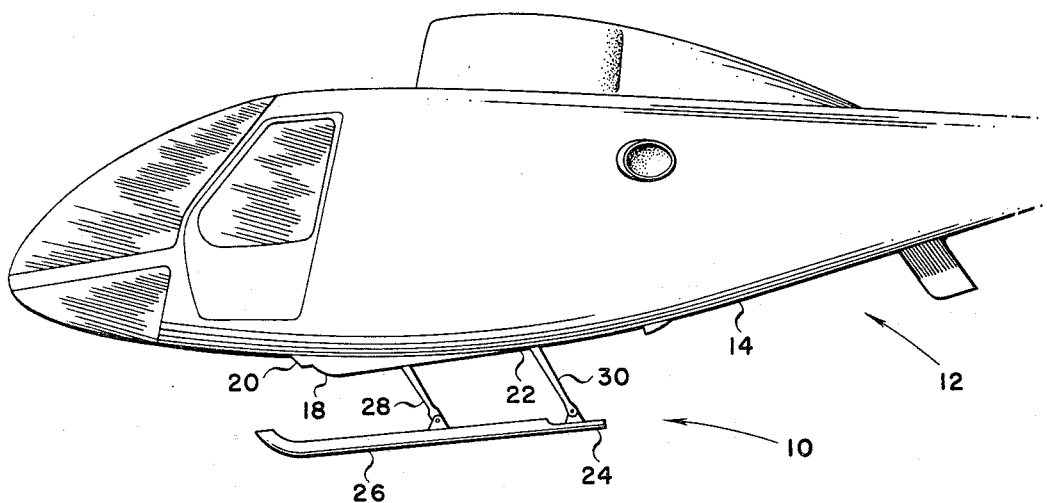
FIGURE 1 is an elevational view of a helicopter employing a retractable, skid-type landing gear of the present invention.

One end of each strut 28 and 30 is pivotally connected to its associated skid 26 by suitable means, such as the pins 40 and brackets 42 shown for one strut 26 in FIGURES 1, 3, and 4. The other end of each aft strut 30 is pivotally connected to fuselage 14 by a pin 43 and the other end of each forward strut 28 is keyed to a torque tube 44.

Each torque tube 44 is of the folded type and includes a solid inner shaft 46 which is externally splined at its ends 48 and 50. The externally splined end 48 engages the internal splines 52 of a crank member 54 and includes an extension 56 (FIGURE 5) which is journaled in a hanger 58 by a bearing 60. Each torque tube 44 also includes a hollow member 62 in which its associated shaft 46 is positioned. Each member 62 is drivingly connected to its shaft 46 by internal splines 64 which engage the externally splined end 50. One end 66 of each member 62 is closed with a cap 68 to prevent the shaft 46 from sliding through the member 62 beyond its end 66. The other end 70 of each member 62 is journaled in a hanger 72 by a bearing 74. Each end 70 is keyed to an associated strut 28, by a pin 76. The hangers 58 and 72 are rigidly affixed to the fuselage 14.

Figure 6:
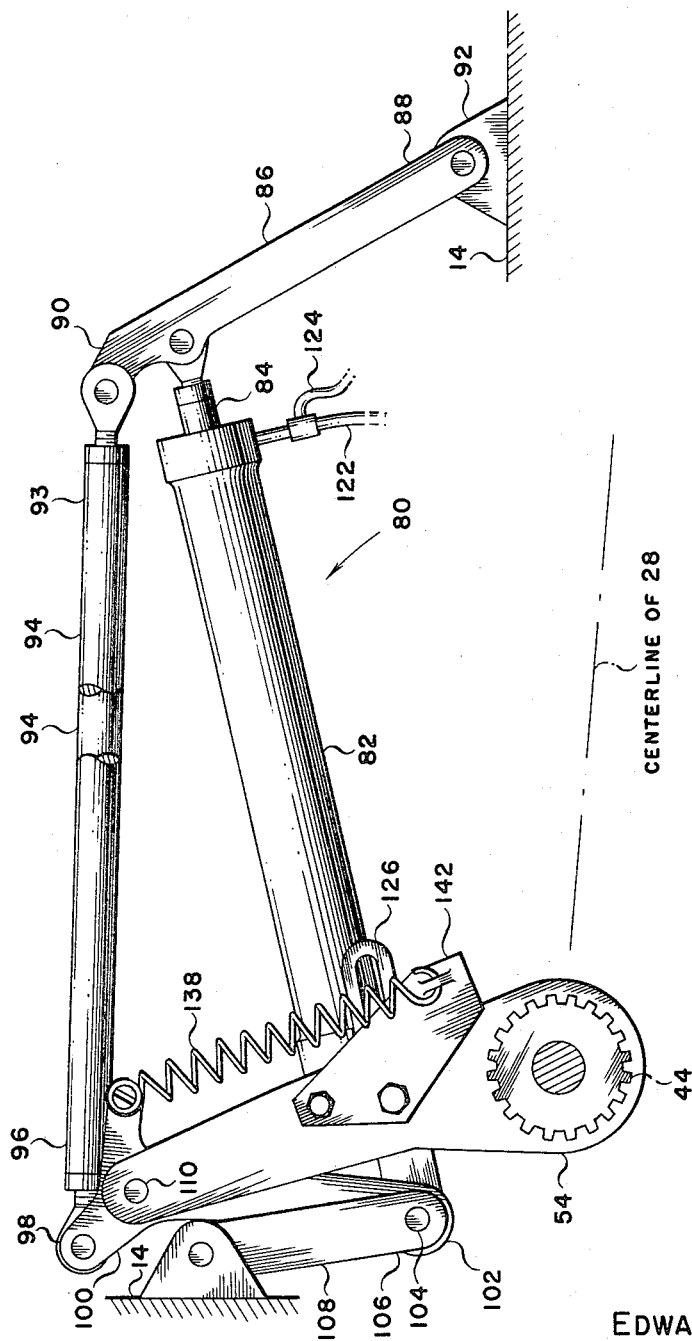
FIGURE 6 is a cross-sectional view taken along line 6—6 of FIGURE 5.

Referring now to FIGURES 6 and 7, each crank member 54 is driven by an actuator assembly 80 including an hydraulic cylinder 82 having a piston rod 84 connected to a bell crank 86 intermediate its ends 88 and 90. The end 88 of bell crank 86 is connected by a pin and bracket assembly 92 to the fuselage 14. The end 90 of each crank 86 is connected to one end 93 of a push rod 94. The other end 96 of rod 94 is connected to one end 98 of a first link 100. The other end 102 of link 100 is connected by a pin 104 to one end 106 of a second over-center link 108. The over-center link 100 is connected intermediate its ends 98 and 102 to the crank member 54 by a pin 110. The hydraulic cylinder 82 is anchored to fuselage 14 by a pin and bracket assembly 112. A piston 114 is reciprocably mounted within hydraulic cylinder 82 and is connected to the piston rod 84. The piston 114 includes a downstream face 116 and an upstream face 118. The landing gear 10 is extended by supplying hydraulic fluid to the downstream face 116 through a first hydraulic line 120. Conversely, the landing gear 10 is retracted by supplying hydraulic fluid to the upstream face 118 through a second hydraulic line 122. Should power to the actuator 80 fail while the landing gear 10 is in a retracted position, pressure may be relieved from cylinder 82 through a bleed line 124 so that the weight of the landing gear will cause it to free-fall to an extended position.

The landing gear 10 is automatically locked in a down position by the over-center links 100 and 108 through a mechanism which will now be described. A slotted link 126 has one end 128 connected to the pin 104 and its slot 130 connected to its associated crank member 54 by a pin 132. The link 100 includes a substantially right-angle extension 134 which is connected to one end 136 of a spring 138. The other end 140 of spring 138 is connected to a bracket 142 which is affixed to the crank member 54. Thus, the spring 138 tends to rotate link 100 about pin 110 in a clockwise direction, as viewed in FIGURE 7, then pull the pin 104 to the over-center position shown, the slotted link 126 controlling the amount of over-travel.

Operation of the device will be readily understood. Assuming that the landing gear 10 is in the retracted position shown in FIGURE 6, the landing gear 10 is extended by the action of piston rod 84 rotating crank 86 in a clockwise direction, thereby moving push rod 94 to the right and causing the crank member 54 to be rotated in a clockwise direction. This causes torque tube 44 to rotate strut 28 in a clockwise direction through the action of shaft 46 (FIGURE 4), until landing gear 10 is fully extended. At this point, spring 138 snaps pin 104 to the over-center position shown in FIGURE 7.

The landing gear 10 is retracted by moving piston rod 84 to the left, as viewed in FIGURE 7, causing bell crank 86 to rotate in a counterclockwise direction. This moves push rod 94 to the left, causing link 100 to rotate in counterclockwise, breaking the over-center connection and rotating crank member 54 in a counterclockwise direction to swing strut 28 up into its stowed position.

While the particular landing gear for aircraft herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:
1. In combination with an aircraft having a fuselage and, retractable landing gear means comprising means defining a landing gear well mounted on said fuselage:
   strut means having first and second ends, said first end pivotally connected to said fuselage and said free end being extendable through said landing gear well to the exterior of said fuselage;
   ground contacting means connected to said second end; and
   actuator means located above said landing gear well and connected to said strut means for retracting said second end into said landing gear well and extending it therefrom, said actuator means and said strut means maintaining at least a portion of said ground contacting means on the exterior of said fuselage when said second end is retracted into said landing gear well, said portion of said ground contacting means cooperating with the exterior of the said fuselage to provide an aerodynamically clean surface when in said retracted position.

2. The combination of claim 1 wherein said aircraft comprises a helicopter.

3. The combination of claim 2 wherein said ground contacting means comprises a pair of skids having upturned ends and having a lower surface substantially conforming to the external shape of said landing gear well.

4. A retractable landing gear in combination with a helicopter having a fuselage, comprising:
   landing gear actuating means mounted in said fuselage;
   means defining a pair of landing gear wells mounted in said fuselage below said landing gear actuating means;
   a first pair of struts, each having a first end pivotally connected to said fuselage and a second end being extendable externally of its respective landing gear well;
   a second pair of struts each having a first end operably connected to said actuating means for rotation thereby, and a second end extendable and retractable through its associated landing gear well when said second strut is rotated in first and second directions respectively; and
   landing elements of the skid-type pivotally connected to said second ends of said first and second pairs of struts, said elements having ground contacting portions extending below said landing gear wells when said second ends of said struts are retracted into said landing gear wells, said elements being faired to minimize wind resistance.

5. The combination of claim 4 wherein said landing gear actuating means comprises:
   a pair of folded-type torque tubes, each of which includes:
      a solid inner shaft having externally splined ends;
      a hollow member having an internally splined end keying said hollow member to one end of said inner shaft and an externally splined end keyed to said one end of an associated second strut;
   a crank member keyed to the other externally splined end of each of said solid inner shafts; and
   power supply means connected to each of said crank members for rotating an associated said inner shaft.

6. The combination of claim 5 wherein said power supply means includes a hydraulic cylinder and means for bleeding said cylinder, whereby said landing gears will free-fall to an extended position.

7. In combination with an aircraft having a fuselage and a landing gear well, a retractable landing gear comprising:
   means defining a pair of landing gear wells mounted in said fuselage below said landing gear actuating means;
   a first pair of struts, each having a first end pivotally connected to said fuselage and a second end being extended externally of its respective said landing gear well;

a second pair of struts, each having a first end operably connected to said actuating means for rotation thereby and a second end extendable and retractable through its associated landing gear well when said second strut is rotated in first and second directions respectively;

landing elements of the skid-type pivotally connected to said second ends of said first and second pairs of struts, said elements having ground contacting portions extending below said landing gear wells when said second ends of said strut are retracted into said landing gear wells, said elements being faired to minimize wind resistance;

a pair of folded-type torque tubes mounted to said fuselage for actuating said landing gear, said torque tubes comprising:
- a solid inner shaft having externally splined ends;
- a hollow member having an internally splined end keying said hollow member to one end of said inner shaft and an externally splined end keyed to said one end of an associated second strut;
- a crank member keyed to the other externally splined end of each of said solid inner shafts; and
- a hydraulic cylinder and means for bleeding said cylinder whereby said landing gears will free-fall to an extended position.

8. In combination with an aircraft having a fuselage and a landing gear well, retractable landing gear means comprising:

strut means connected to said fuselage;

ground contacting means connected to said strut means, said ground contacting means comprising a pair of skids having up-turned ends and substantially conforming to the external shape of said landing gear well;

actuator means connected to said strut means for retracting said strut means, said actuator means comprising:
- a pair of folded-type torque tubes, each of which includes:
  - a solid inner shaft having externally splined ends;
  - a hollow member having an internally splined end keying said hollow member to one end of said inner shaft and an externally splined end keyed to said one end of an associated second strut;
- a crank member keyed to the other externally splined end of each of said solid inner shafts; and
- a hydraulic cylinder and means for bleeding said cylinder, whereby said landing gears will free-fall to an extended position.

References Cited

UNITED STATES PATENTS

| | | | |
|---|---|---|---|
| 2,487,548 | 11/1949 | Hawkins | 244—102 |
| 2,574,404 | 11/1951 | Lucien | 244—102 |
| 2,844,339 | 7/1958 | Stroukoff | 244—102 |
| 3,173,632 | 3/1965 | Woods | 244—100 |
| 3,185,409 | 5/1965 | Jacobsen | 244—102 XR |

FOREIGN PATENTS 326,705   3/1930   Great Britain.

MILTON BUCHLER, *Primary Examiner.*

FERGUS S. MIDDLETON, *Examiner.*

P. E. SAUBERER, *Assistant Examiner.*